(12) United States Patent
Kong et al.

(10) Patent No.: US 10,692,203 B2
(45) Date of Patent: Jun. 23, 2020

(54) MEASURING DEFECTIVITY BY EQUIPPING MODEL-LESS SCATTEROMETRY WITH COGNITIVE MACHINE LEARNING

(71) Applicant: International Business Machines Corporation, Armonk, NY (US)

(72) Inventors: Dexin Kong, Guilderland, NY (US); Robin Hsin Kuo Chao, Cohoes, NY (US); Huai Huang, Saratoga, NY (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 15/899,197

(22) Filed: Feb. 19, 2018

(65) Prior Publication Data
US 2019/0259145 A1 Aug. 22, 2019

(51) Int. Cl.
*G06T 7/00* (2017.01)
*G06N 20/00* (2019.01)

(52) U.S. Cl.
CPC .......... *G06T 7/0004* (2013.01); *G06N 20/00* (2019.01); *G06T 2207/10061* (2013.01); *G06T 2207/30148* (2013.01)

(58) Field of Classification Search
CPC .............. G06N 20/00; G06T 7/0004; G06T 2207/10061; G06T 2207/20072; G06T 2207/20076; G06T 2207/20081; G06T 2207/3014
See application file for complete search history.

(56) References Cited

U.S. PATENT DOCUMENTS

| 7,052,921 | B1 | 5/2006 | Plat et al. |
| 7,940,386 | B1* | 5/2011 | Bevis ................. G01N 21/4785 356/243.4 |
| 2015/0323316 | A1* | 11/2015 | Shchegrov ......... G01N 21/9501 702/150 |
| 2017/0177760 | A1* | 6/2017 | Socha ................. G03F 7/70616 |
| 2017/0287754 | A1 | 10/2017 | Nabeth et al. |

(Continued)

OTHER PUBLICATIONS

Kim et al., "Scanner focus metrology for advanced node scanner monitoring and control," Proc. SPIE Advanced Lithography, 9424, pp. 1-12 (Mar. 2015).

(Continued)

*Primary Examiner* — Mekonen T Bekele
(74) *Attorney, Agent, or Firm* — Vazken Alexanian; Michael J. Chang, LLC

(57) ABSTRACT

Techniques for measuring defectivity using model-less scatterometry with cognitive machine learning are provided. In one aspect, a method for defectivity detection includes: capturing SEM images of defects from a plurality of training wafers; classifying type and density of the defects from the SEM images; making training scatterometry scans of a same location on the training wafers as the SEM images; training a machine learning model to correlate the training scatterometry scans with the type and density of the defects from the same location in the SEM images; making scatterometry scans of production wafers; and detecting defectivity in the production wafers by measuring the type and density of the defects in the production wafers using the machine learning model, as trained, and the scatterometry scans of the production wafers. A system for defectivity detection is also provided.

20 Claims, 6 Drawing Sheets

(56) References Cited

U.S. PATENT DOCUMENTS

| | | |
|---|---|---|
| 2017/0315055 A1 | 11/2017 | Tinnemans et al. |
| 2017/0343903 A1 | 11/2017 | Lee et al. |
| 2017/0357155 A1 | 12/2017 | Quintanilha et al. |
| 2017/0363950 A1 | 12/2017 | Sriraman et al. |
| 2018/0252514 A1* | 9/2018 | Pandev .................... G06T 7/60 |
| 2019/0086200 A1* | 3/2019 | Amit .................. G03F 7/70683 |

OTHER PUBLICATIONS

Zhou et al., "Advanced Lithography Parameters Extraction by using Scatterometry System," Metrology, Inspection, and Process Control for Microlithography XXI, Proc. SPIE vol. 6518, pp. 1-11 (Apr. 2007).

Zhou et al., "Determination of DICD Best Focus by Top-down CD-SEM," Proc. SPIE, 4689, pp. 661-671 (Jul. 2002).

Egret et al., "Multivariate analysis of a 100-nm process measured by in-line scatterometry" Proc. SPIE, 5375, pp. 296-306 (May 2004).

Bunday et al., "Metrology capabilities and needs for 7nm and 5nm logic nodes," Proc. SPIE, 10145, pp. 1-41 (Mar. 2017).

Kim et al., "Automatic Defect Detection from SEM Images of Wafers using Component Tree," Journal of Semiconductor Technology and Science, vol. 17, No. 1, pp. 86-93 (Feb. 2017).

Zontak et al., "Defect detection in patterned wafers using anisotropic kernels," Machine Vision and Applications, vol. 21, issue 2, pp. 129-141 (Feb. 2010).

Herbert K.H. Lee, "A Framework for Nonparametric Regression Using Neural Networks," Duke University (Sep. 2000) (16 total pages).

J.R. Quinlan, "Induction of Decision Trees," Machine Learning, 1:81-106 (1986).

Snoek et al., "Practical Bayesian Optimization of Machine Learning Algorithms," Conference of the Neural Information Processing Systems Foundation (Dec. 2012) (9 total pages).

\* cited by examiner

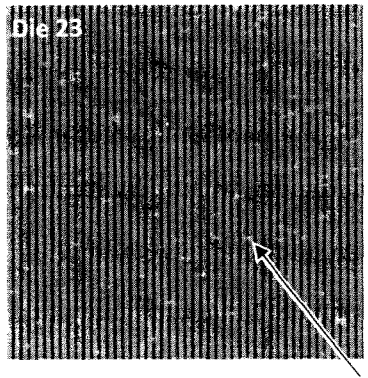
FIG. 5  SiGe nodules
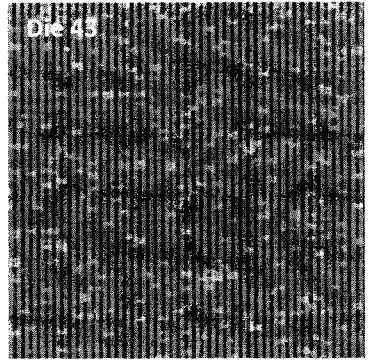
FIG. 6
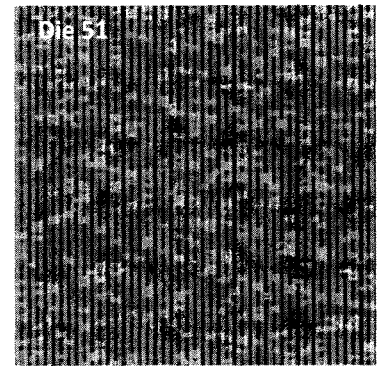
FIG. 7
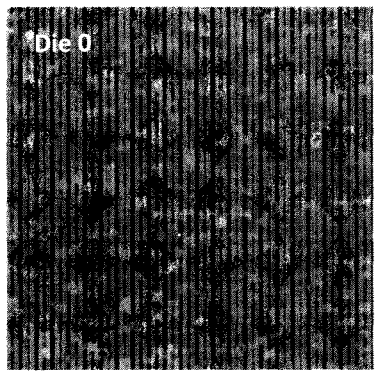
FIG. 8
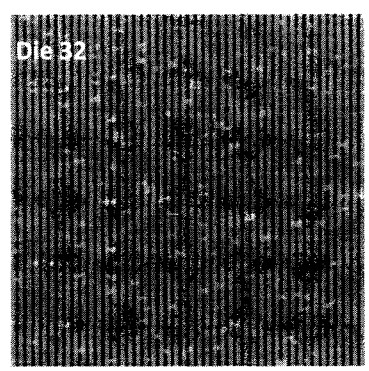
FIG. 9
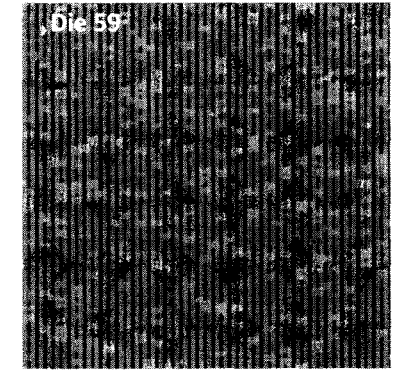
FIG. 10
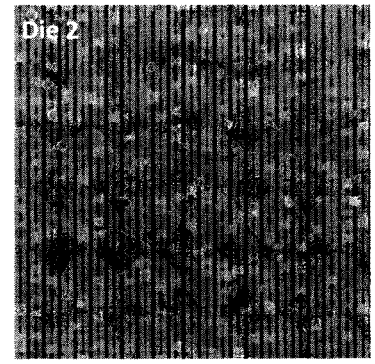
FIG. 11

MEASURING DEFECTIVITY BY EQUIPPING MODEL-LESS SCATTEROMETRY WITH COGNITIVE MACHINE LEARNING

FIELD OF THE INVENTION

The present invention relates to defectivity inspection, and more particularly, to techniques for measuring defectivity using model-less scatterometry with cognitive machine learning.

BACKGROUND OF THE INVENTION

Current defectivity inspection technology is very complicated and takes several steps. For instance, an incoming wafer first undergoes an optical beam inspection. The optical beam inspection detects by capturing images of wafers using different wavelengths of light. Select defects (identified via the optical beam inspection) are then imaged using, e.g., top-down scanning electron microscope (SEM) imaging. From the images, the defects are then classified. This classification is usually done by eye by a user visually inspecting the results. The results are then stored for future reference. As such, the current inspection technology is extremely time consuming, and has a low throughput.

Further, the optical inspection is likely to fail in detecting defects on heavily defective wafers. For instance, defects are detected based on regions appearing differently in the images from one die/chip to another on the same wafer, i.e., the differing regions are the defects. However, with a high defect density the same defects can occur from die to die on the same wafer, and thereby escape detection.

The top-down SEM images may also fail to detect all of the defects identified by the optical inspection due to wafer misalignment. Specifically, misalignment can result in the SEM capturing images of the wafer offset from the regions where the optical inspection found defects.

Further, the optical inspection may be able to detect buried defects. However, because the defects are buried, the top-down SEM images may not be able to image them. Thus, these defects would not be identified through the process.

Accordingly, improved defectivity inspection techniques that are less time-consuming and less labor-intensive, increase throughput, and which are adaptive to detecting new defects as they arise would be desirable.

SUMMARY OF THE INVENTION

The present invention provides techniques for measuring defectivity using model-less scatterometry with cognitive machine learning. In one aspect of the invention, a method for defectivity detection is provided. The method includes: capturing scanning electron microscope (SEM) images of defects from a plurality of training wafers; classifying type and density of the defects from the SEM images; making training scatterometry scans of a same location on the training wafers as the SEM images; training a machine learning model to correlate the training scatterometry scans with the type and density of the defects from the same location in the SEM images; making scatterometry scans of production wafers; and detecting defectivity in the production wafers by measuring the type and density of the defects in the production wafers using the machine learning model, as trained, and the scatterometry scans of the production wafers.

In another aspect of the invention, a system for defectivity detection is provided. The system includes at least one processor device, coupled to a memory, the processor device being implementable to: obtain SEM images of defects from a plurality of training wafers; classify type and density of the defects from the SEM images; obtain training scatterometry scans of a same location on the training wafers as the SEM images; train a machine learning model to correlate the training scatterometry scans with the type and density of the defects from the same location in the SEM images; obtain scatterometry scans of production wafers; and detect defectivity in the production wafers by measuring the type and density of the defects in the production wafers using the machine learning model, as trained, and the scatterometry scans of the production wafers.

A more complete understanding of the present invention, as well as further features and advantages of the present invention, will be obtained by reference to the following detailed description and drawings.

BRIEF DESCRIPTION OF THE DRAWINGS

FIG. 5 is a scanning electron microscope (SEM) image of an exemplary die (Die 23) having defects according to an embodiment of the present invention;

FIG. 6 is an SEM image of an exemplary die (Die 43) having defects according to an embodiment of the present invention;

FIG. 7 is an SEM image of an exemplary die (Die 51) having defects according to an embodiment of the present invention;

FIG. 8 is an SEM image of an exemplary die (Die 0) having defects according to an embodiment of the present invention;

FIG. 9 is an SEM image of an exemplary die (Die 32) having defects according to an embodiment of the present invention;

FIG. 10 is an SEM image of an exemplary die (Die 59) having defects according to an embodiment of the present invention;

FIG. 11 is an SEM image of an exemplary die (Die 2) having defects according to an embodiment of the present invention.

DETAILED DESCRIPTION OF PREFERRED EMBODIMENTS

Provided herein are techniques for measuring defects using model-less scatterometry and cognitive machine learning (ML)-based on a correlation between scatterometry spectral features and defect types/densities. Defects occur randomly during semiconductor fabrication. Thus, there is no way to build a model to mimic the structures being measured. Advantageously, the present techniques do not rely on models (i.e., the present process is model-less). Namely, the present techniques correlate raw scatterometry data with scanning electron microscope (SEM) images of defect type and density to train the machine-learning process to identify these defects during subsequent wafer scans. Thus, no model is needed for comparison.

Further, with proper training the present scatterometry and machine learning-based techniques are much simpler than the conventional defectivity inspection technology which, as described above, involves optical inspection of a wafer, top-down SEM imaging of select defect regions of the wafer, and manual classification by a user. As such, the present techniques are less costly to implement and offer a much higher throughput as compared to the conventional technology. Further, the present scatterometry and machine learning-based techniques will not fail even when the defect density is high.

Generally, the present techniques involve two main phases, first a cognitive machine learning model training phase, and second an in-line measurement phase using the trained machine learning model. Advantageously, as will be described in detail below, the model is adaptive to learning new defects if and when they arise during the measurement phase.

Figure 1:
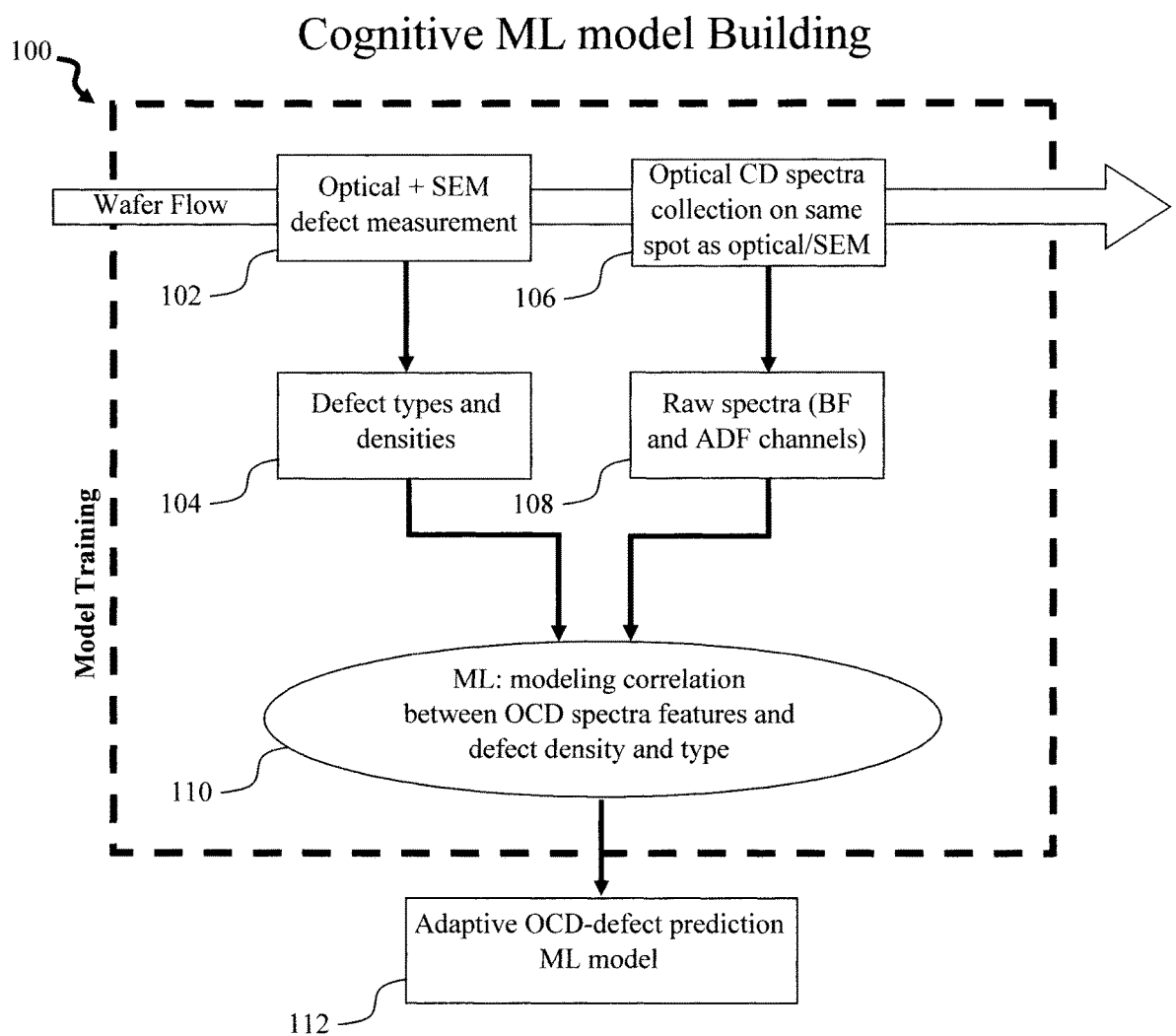
FIG. 1 is a diagram illustrating an exemplary methodology for training a machine learning model for defectivity detection according to an embodiment of the present invention.

Training Phase: The model training phase of the present techniques is now described by way of reference to methodology 100 of FIG. 1. In this first phase, a significant number of (training) wafers (see "wafer flow") will go through both traditional (optical inspection and SEM) measurement (see step 102) and scatterometry measurement (see step 106). The scatterometry measurement (step 106) will be performed on the same spot on the wafer as the optical inspection/SEM measurement (step 102) such that direct correlations can be made in machine learning (ML) modeling step 110 between the defect types and densities extracted in step 104 from the optical inspection/SEM measurements and the raw spectra extracted in step 108 from the scatterometry measurements. By way of this training phase, a trained defect prediction machine learning model is obtained in step 112. To quantify the number of training wafers, there are two criteria. First, the number of training wafers has to provide enough statistical significance, e.g., 100. Second, the training wafers have to include a majority of the defect types and the typical variation of each type of defects.

If during the measurement phase (see below) a new defect is detected, the model is adaptive to learn the new defect. Thus, the present machine learning model is constantly evolving to accommodate new defects as they arise. As such, with use and sufficient training, the model will be able to measure a vast number of defects.

Specifically, during the model training phase, each (training) wafer first undergoes optical inspection and SEM defect measurement in step 102. For clarity of description, the wafers used during the training phase may also be referred to herein as "training" wafers so as to distinguish them from the wafers measured during semiconductor production, i.e., the "production wafers," via the trained machine leaning model—see below. This distinction is however somewhat arbitrary since, as will be described below, training occurs anytime new spectra are encountered.

According to an exemplary embodiment step 102 involves using optical beam inspection to capture images of the wafers using different wavelengths of light. Suitable optical beam imaging tools are commercially available, for example, from KLA-Tencor Corporation, Milpitas, Calif. The images taken of different (i.e., two or more) dies on a wafer are compared by the tool to identify defects. Namely, when comparing the images, those spots on the wafer that appear differently from one die to another are typically indicative of defects. The term "die" (or the plural form "dies"), as used herein, refers to individual integrated circuits formed on a wafer. For instance, during production, many copies of the circuit are typically formed on a common wafer. The wafer is then divided up into individual dies, each die containing a copy of the circuit.

Semiconductor wafer processing typically involves a number of processes that are carried out to fabricate devices such as dies/chips and/or other integrated circuits on the wafer. Variations in the process (such as exposure time, dose, etc.) as well as external factors (such as contamination with dust or other particles) can lead to defects such as features of the device that are produced outside of their specified tolerances. Typically, the fabrication involves a large number of steps that build on one another. Thus, defects that occur in one step can have a costly effect in terms of time, production cost, effort, etc. on later steps in the process. Thus, detection of these defects as early in the process as possible is key to preventing costly mistakes that can lead to out-of-specification wafers. As such, it is notable that the present techniques can be implemented during multiple different points in the fabrication process to detect defects as they occur. For instance, the model training (as per methodology 100) and inline scatterometry measurements (as per methodology 200—see below) can be performed at multiple points during the fabrication process.

In that regard, during the model training phase, if it is assumed that the dies being used are subject to the same manufacturing processes then ideally (if no defects occur) the dies should appear the same during the optical inspection. To look at it another way, the source for variation from die to die in a common process flow are assumed to be the result of defects in the wafers. Thus, when comparing images of the dies, any differences can be attributed to these defects.

The next process performed in step 102 is to capture top-down SEM images of those defects identified by the optical inspection. The top-down SEM images are used in step 104 to characterize the types of defects that are occurring and their density. Namely, the optical inspection provides the opportunity to comprehensively scan the entire wafer and home in on specific spots on the wafer that include defects. A more detailed analysis of the defects (i.e., type and density) is then obtained for those specific spots on the wafer via the top-down SEM images. By way of example only, the types of defects that may occur during semiconductor processing can include, but are not limited to, misaligned features, features that are out of specification such as layers that are too thick or too thin, patterning variations, unwanted epitaxial growth, etc. For instance, during deposition, patterning, etc. variations can occur from one wafer to another (inter-wafer variation) and/or within the same wafer (intra-wafer variation). For example, exposures at the center and edges of the wafer can oftentimes vary from one another. If the difference is large enough, the result can lead to defective devices. Further, with the scaling of device dimensions, the impact of inter/intra wafer variations becomes increasingly more significant.

The density of the defects refers simply to the number of defects detected per unit area of the wafer. Knowing the defect density is important as it provides a metric to quantify the severity of the defects for each given spot on the wafer. Further, as provided above, areas of high defect density pose a challenge for traditional defectivity measurement processes as individual defects can merge with one another. However, advantageously, the present techniques enable one to accurately discern spots on the wafers having different defect densities. Notably, scatterometry is not image-based, i.e., scatterometry is a spectroscopic technique, so scatterometry does not involve comparing two (or more) images to find defects. Thus, scatterometry scans will reveal statistical information about defects, e.g., defect density and average defect size. If defects merge, the output will be smaller defect density, and larger average size.

According to an exemplary embodiment, defects are classified from the SEM images using an automated detection process. By way of example only, processes such as component tree and anisotropic kernel may be employed for detection. See, for example, Kim et al., "Automatic Defect Detection from SEM Images of Wafers using Component Tree," Journal of Semiconductor Technology and Science, vol. 17, no. 1, pgs. 86-93 (February 2017) (using component tree representations), and Zontak et al., "Defect detection in patterned wafers using anisotropic kernels," Machine Vision and Applications, vol. 21, issue 2, pp. 129-141 (February 2010) (using anisotropic kernel reconstruction), the contents of each of which are incorporated by reference as if fully set forth herein.

Scatterometry optical critical dimension (CD) measurements are then made in step 106 of the same spot(s) on the wafers from which the top-down SEM images were taken (in step 102). Scatterometry is a metrology technique that can be employed to measure the surface properties of the wafers, in a non-contact manner, using a beam of light directed at the surface of the wafers. Specifically, a scatterometer (see below) is used to direct light (from a light source of the scatterometer) onto the same spots on the surface of the wafers in the wafer flow (see FIG. 1) from which the top-down SEM images were captured in step 102. The light returned from those spots on the surfaces of the wafers is then captured by a light detector of the scatterometer. The light captured by the light detectors will vary depending on the surface geometry of the wafers and how they scatter different wavelengths of the light. Suitable scatterometers for use in accordance with the present techniques are commercially available, e.g., from KLA-Tencor Corporation, Milpitas, Calif. and from Nova Ltd., Rehovot, Israel.

The results of the scatterometry measurements are spectra of wavelength and reflectance data for each of the wafers in the training data set. Exemplary scatterometry spectra are provided below. Via the machine learning process, these spectra will be correlated with the defects (type and density) detected using the SEM images from step 102.

As provided above, the scatterometry measurements will be performed in step 106 on the same location(s) of the wafer of which the SEM images (from step 102) are taken in order to enable training the machine-learning process to correlate the raw spectral (scatterometry) data with the corresponding defects (i.e., type and density) in the SEM images. According to an exemplary embodiment, the raw spectral data obtained in step 108 from the scatterometry measurements includes spectral data from both bright field (BF) and angular dark field (ADF) channels. BF channels are sensitive to regular patterned structures, and thus can be used to measure critical dimensions (CD) of regular patterned structures. The presence of irregular/random structures can also cause BF spectra change, but in very low sensitivity. ADF channels, on the other hand, are sensitive to random or irregular features, e.g., defects, roughness, etc.

The machine learning process is then trained in step 110 to model correlations between the raw spectra (e.g., BF and ADF channel) data from the scatterometry measurements and the defect data (e.g., defect type and density) from the SEM images. The goal of the model training phase is to produce a trained machine learning model that can be subsequently used (in a measurement phase) to recognize/detect defects (e.g., defect type and density) in wafers based only on their scatterometry spectra (i.e., without needing to obtain top-down SEM images of the wafers). See step 112. Further, as will be described in detail below, the machine learning process has self-adaptive capabilities to newly untrained spectra as they occur.

In general, machine learning involves making deductions based on characteristics learned from (training) data. With the present techniques, the training data for the machine learning process includes the scatterometry data as features and the defects (type and density) as labels. The machine learning process is then trained to determine, based on scatterometry data, the defects (type and density) that are likely present. Thus, scatterometry data will be the input to the trained machine learning process and the defect (type and density) will be the output. Machine learning is applied to the training data set and acquires the capability of identifying defects when given an input scatterometry spectra.

Suitable machine learning processes include, but are not limited to, simple linear regression approaches, or advanced processes such as neural network or regression tree-based nonparametric regression methods, or Bayesian parameter optimization methods. Neural network-based nonparametric regression is described, for example, in Herbert K. H. Lee, "A Framework for Nonparametric Regression Using Neural Networks," Duke University (September 2000) (16 total pages), the contents of which are incorporated by reference as if fully set forth herein. Regression tree-based nonparametric regression techniques are described, for example, in J. R. Quinlan, "Induction of Decision Trees," Machine Learning, 1:81-106 (1986), the contents of which are incorporated by reference as if fully set forth herein. Bayesian parameter optimization is described, for example, in Snoek et al., "Practical Bayesian Optimization of Machine Learning Algorithms," Conference of the Neural Information Processing Systems Foundation (December 2012), the contents of which are incorporated by reference as if fully set forth herein.

A significant number of wafers (subject to both SEM-based inspection and scatterometry measurement) are needed as the training set to train the machine learning process. The size of the training set will depend, for example, on the performance of the (trained) model when evaluated against measured defects, with an accuracy target being greater than 90%. To use a simple example, say for instance that 100 wafers are employed which include defects and a range of defect densities. A subset of those wafers (e.g., 80 wafers) are used to train the machine learning model. Once trained, the remaining (e.g., 20 wafers) are used to test the model by comparing the output from machine learning model with the measured defect information for the 20 wafers. If the model accuracy is >90%, then the model is ready to use. On the other hand, if the model accuracy is <90%, then the training process can be repeated, e.g., with 100 new training wafers, until the requisite accuracy is achieved. Further, once installed in the production line, the machine learning model will become more and more accurate because of adaptive learning.

Figure 2:
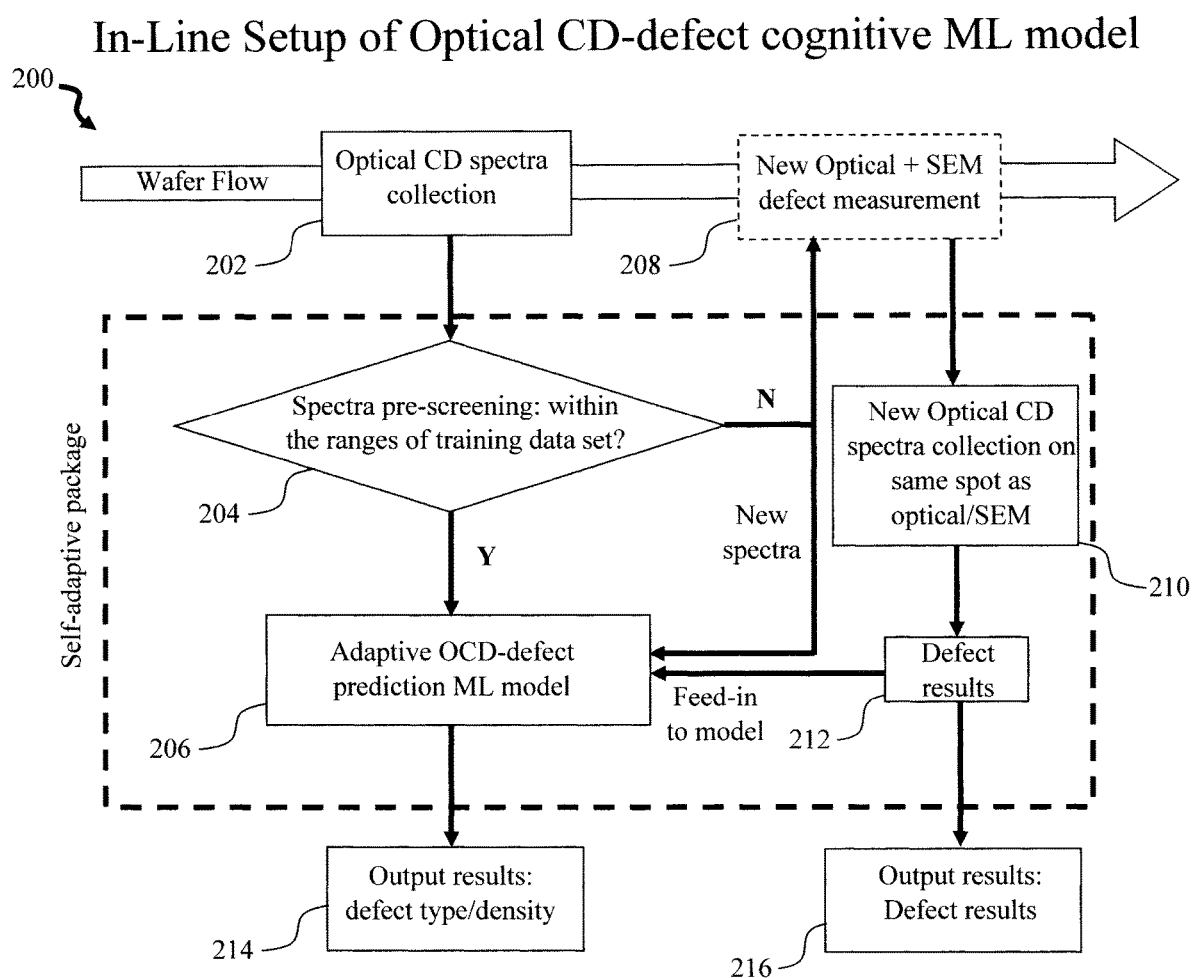
FIG. 2 is a diagram illustrating an exemplary methodology for using the trained machine learning model for defectivity detection according to an embodiment of the present invention.

Measurement Phase: During the measurement phase, the trained machine learning model (from methodology 100) and scatterometry data are used for defect detection in wafers during semiconductor fabrication. See, for example, methodology 200 of FIG. 2. Advantageously, for those defects which the machine learning model has been trained to recognize, the trained model needs only the scatterometry spectra (obtained in step 202) for defect detection.

As described above, the present scatterometry measurement involves capturing spectra of light diffracted by the surface geometry of the wafers. Scatterometry scans are fast (e.g., a scan of the entire wafer can take from about 2 minutes to about 3 minutes, and ranges therebetween). As such, there is not much of a difference (time-wise) if the scatterometry scans are performed of whole wafer or only individual locations, it just depends on the purpose. For instance, as provided above, during the training phase the scatterometry scans are confined to the same locations on the wafer captured in the SEMs. Similarly, training performed on the fly during the measurement phase (e.g., when new spectra is encountered—see below) might use scans localized to the defect locations in the SEMs. On the other hand, more comprehensive scans of the entire wafer might be performed during the measurement phase to get a better assessment of the full wafer topography. Further, since the scatterometry scans are fast, it is feasible to scan each wafer in the semiconductor fabrication process—see "wafer flow," potentially at multiple different points in the process. Thus, according to an exemplary embodiment, scatterometry scans are made in step 202 of at least a portion of each wafer in the semiconductor fabrication process. Also, scatterometry scans are preferably made for each of the wafers at multiple points along the process flow. In that case, each wafer is scanned more than once during the fabrication process.

A pre-screening process is used to determine whether the scatterometry spectra (obtained in step 202) is in range of the training data set (i.e., whether the machine learning model has been trained to recognize this spectra/defect). If not, the training phase is reiterated on the fly, such that the machine-learning model can learn this new defect.

Namely, in step 204 (pre-screening), a determination is made as to whether the scatterometry measurements from step 202 of a given wafer are within range of the training data used to train the machine learning process. See methodology 100, described above. The notion here is that the machine learning process has to have already been trained (via the training data) in order to recognize the scatterometry data. For new spectra, not in the range of the training data, additional training will be needed—which is what the pre-screening seeks to identify.

Assume, for example, that 10,000 spectra are used to train the machine learning model. If the training spectra are consolidated into a common scatterometry plot, they will produce a band having upper and lower boundaries. When newly collected spectra are in between the upper and lower boundaries, they are within range (of the training data) and the machine learning model can "understand" and analyze the new spectra. On the other hand, any of the newly collected spectra that are outside of the band defined by the upper and lower boundaries are not within range, and those wafers need to go through SEM mapping measurement for machine learning model training.

Thus, if it is determined in step 204 that, no (N) the scatterometry measurements from the given wafer are not within the range of the training data, then the machine learning model needs to be trained to recognize these new defects. The same process as described above is then performed to train the machine learning model to recognize the 'new' spectra. Namely, as provided above, training involves making (in this case 'new') optical inspection and SEM measurements (see step 208) and scatterometry measurement (see step 210) of a same location on the wafer. It is notable that if the scatterometry scan (from step 202) is localized to a location of the wafer that can be captured via SEM (see above), then rescanning the wafer in step 210 might not be necessary.

The results of the SEM analysis (i.e., defect type/density) and the scatterometry scans (i.e., raw spectra (BF and ADF channels)) obtained in step 212 are then fed into the machine learning model which correlates the defect types/densities extracted from the SEM and the raw spectra extracted from the scatterometry measurements. As such, the machine learning model is now trained to recognize the new spectra.

The machine learning model can then determine defect type/density, and average defect size from the scatterometry scans alone (i.e., no SEM imaging is needed) including the new spectra which is it now trained to recognize. These results are output in step 214. Optionally, the data from the SEM analysis (i.e., defect type/density) and the scatterometry scans (i.e., raw spectra (BF and ADF channels)) used in the training can also be provided in step 216.

If, on the other hand, it is determined in step 204 that, yes (Y) the scatterometry spectra (from step 202) are within the range of the training data, then no further training is needed. In step 206 the (trained) machine-learning model is then used to determine defect type/density, and average defect size from the scatterometry scans alone (i.e., no SEM imaging is needed). The results are output in step 214.

Figure 3:
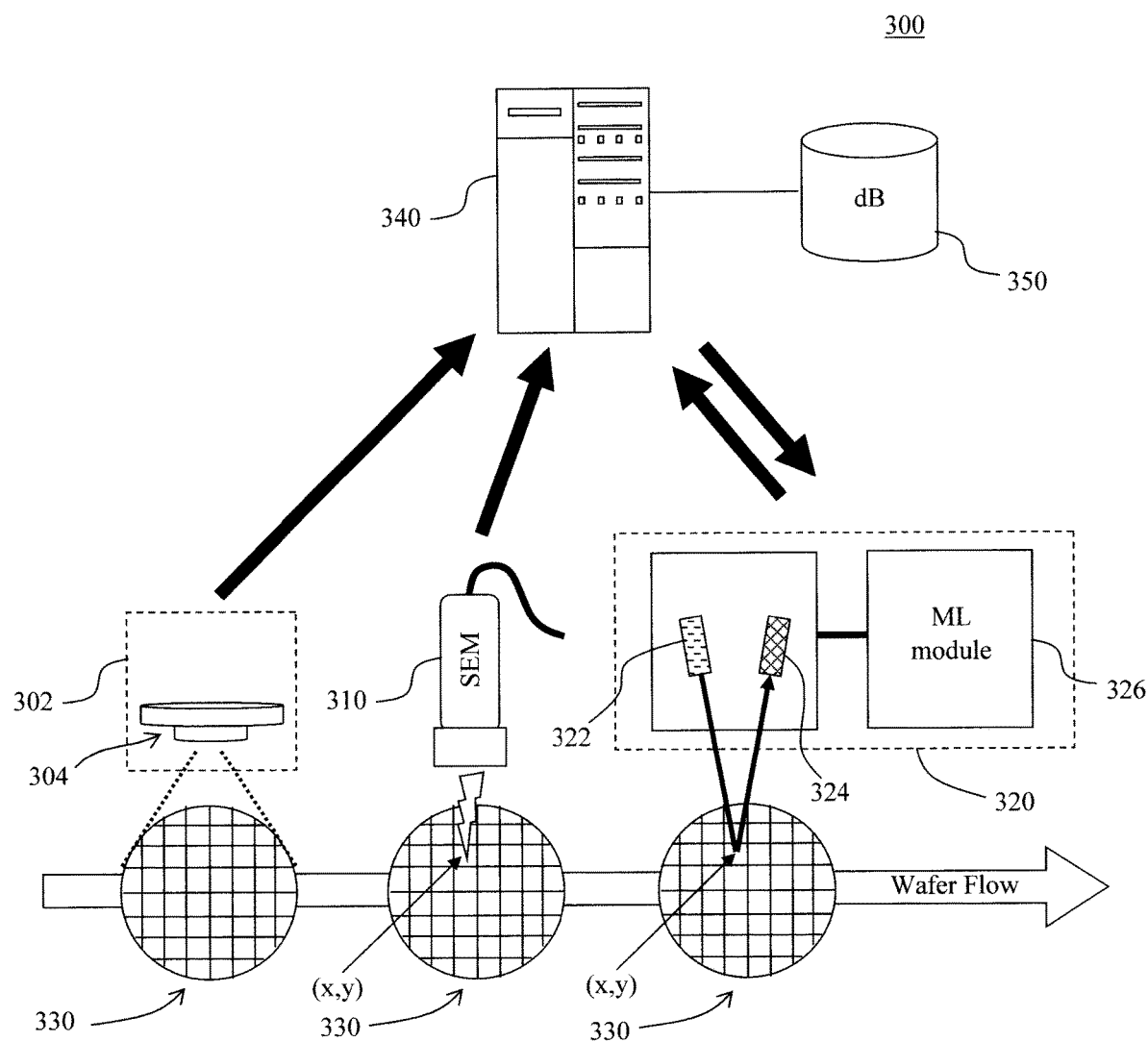
FIG. 3 is a diagram illustrating an exemplary system for defectivity detection according to an embodiment of the present invention.

FIG. 3 is a diagram illustrating an exemplary defect detection system 300. System 300 may be configured to perform the steps of methodology 100 of FIG. 1 and/or the steps of methodology 200 of FIG. 2. As shown in FIG. 3, system 300 includes an optical beam imaging tool 302, an SEM 310 and a scatterometer 320. Each of these components is shown in relation to the production flow of wafers 330 through the system 300. It is to be understood, however, that FIG. 3 illustrates only one possible configuration contemplated herein for the defect detection system 300. For instance, the various components can be implemented in any order relative to the wafer process flow. Further, one or more additional components may be integrated into system 300 in accordance with the present techniques.

As shown in FIG. 3, the optical beam imaging tool 302 includes an image sensor 304 that is configured to capture an image of each of the wafers 300 in the wafer flow. The images from the optical beam imaging tool 302 can be transmitted to a server 340 for analysis and/or to a database 350 for storage. As described above, the images from the optical beam imaging tool 302 are compared from one wafer 300 to another. Wafer locations (x,y) that appear differently from one image to another are indicative of defects. Those (defect) locations (x,y) are then analyzed (i.e., to determine defect type and density) using the SEM 310. The data from the SEM 310 can be uploaded to the server 340 for analysis and/or to the database 350 for storage.

For the machine learning process, the scatterometer 320 is then used to capture scatterometry scans of the same locations (x,y) as the SEM 310. As shown in FIG. 3, the scatterometer 320 includes at least one light source 322 and at least one light detector 324. The way in which light produced by the light source(s) 322 and captured by the light detector(s) 324 is scattered depends on the surface geometry (including defects) of the wafers 330. In this exemplary embodiment, the scatterometer 320 hardware is equipped with an adaptive cognitive machine learning (ML) module 326 that is configured to correlate results (i.e., defect type/density) from the SEM 310 and the scatterometry scans from the scatterometer 320 during the training phase (see, for example, methodology 100 of FIG. 1—described above), and to detect defects from the scatterometry scans from the scatterometer 320 during the measurement phase (see, for example, methodology 200 of FIG. 2—described above). Thus, as shown in FIG. 3, scan data from the scatterometer 320 can be uploaded to the server 340 for analysis and/or to the database 350 for storage. The scatterometer 320/ML module 326 can also retrieve data (such as the defect results from the SEMs) from the server 340 and/or the database 350 when needed for training.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
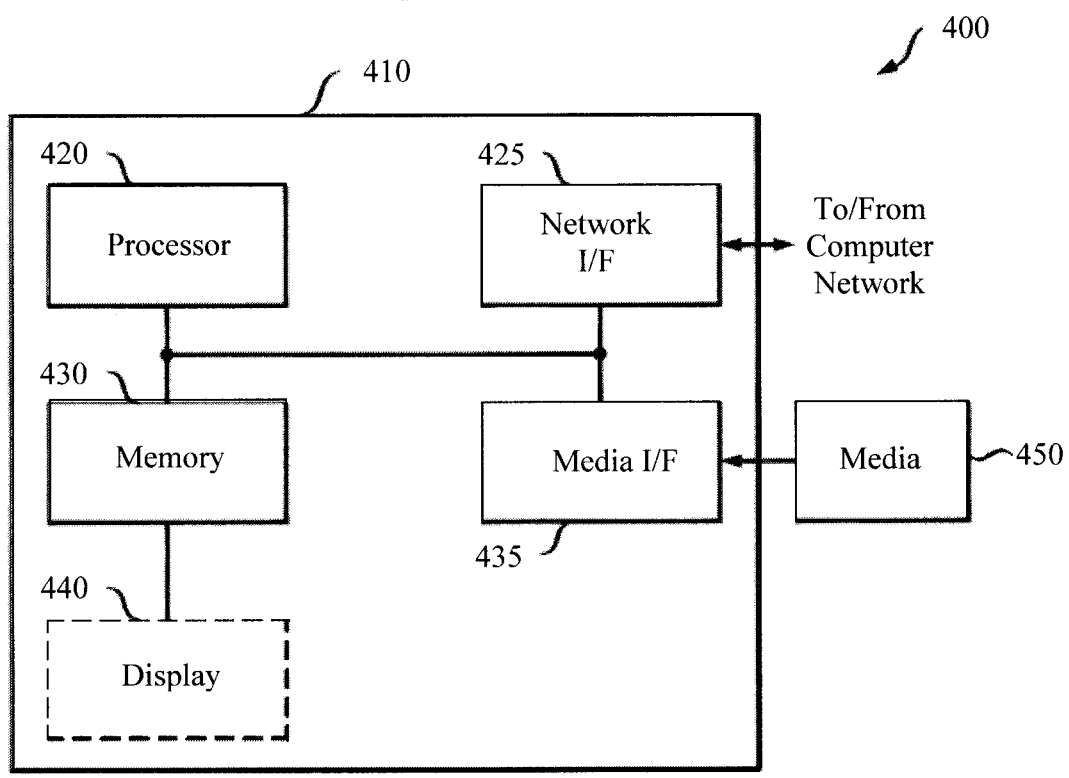
FIG. 4 is a diagram illustrating an exemplary apparatus for performing one or more of the methodologies provided herein according to an embodiment of the present invention.

Turning now to FIG. 4, a block diagram is shown of an apparatus 400 for implementing one or more of the methodologies presented herein. By way of example only, apparatus 400 can be implemented as the server 340 and/or as the machine learning (ML) module 326 in system 300 of FIG. 3, and can be configured to perform one or more of the steps of methodology 100 of FIG. 1 and/or one or more of the steps of methodology 200 of FIG. 2. For instance, apparatus 400 may be configured to obtain SEM images (i.e., from the SEM 310) of defects from the training wafers; classify the type and density of the defects from the SEM images; obtain training scatterometry scans (i.e., from the scatterometer 320) of the same location on the training wafers as the SEM images; train the machine learning model to correlate the training scatterometry scans with the type and density of the defects from the same location in the SEM images; obtain scatterometry scans (i.e., from the scatterometer 320) of the production wafers; and measure the type and density of the defects in the production wafers using the machine learning model, as trained, and the scatterometry scans of the production wafers.

Apparatus 400 includes a computer system 410 and removable media 450. Computer system 410 includes a processor device 420, a network interface 425, a memory 430, a media interface 435 and an optional display 440. Network interface 425 allows computer system 410 to connect to a network, while media interface 435 allows computer system 410 to interact with media, such as a hard drive or removable media 450.

Processor device 420 can be configured to implement the methods, steps, and functions disclosed herein. The memory 430 could be distributed or local and the processor device 420 could be distributed or singular. The memory 430 could be implemented as an electrical, magnetic or optical memory, or any combination of these or other types of storage devices. Moreover, the term "memory" should be construed broadly enough to encompass any information able to be read from, or written to, an address in the addressable space accessed by processor device 420. With this definition, information on a network, accessible through network interface 425, is still within memory 430 because the processor device 420 can retrieve the information from the network. It should be noted that each distributed processor that makes up processor device 420 generally contains its own addressable memory space. It should also be noted that some or all of computer system 410 can be incorporated into an application-specific or general-use integrated circuit.

Optional display 440 is any type of display suitable for interacting with a human user of apparatus 400. Generally, display 440 is a computer monitor or other similar display.

Figure 12:
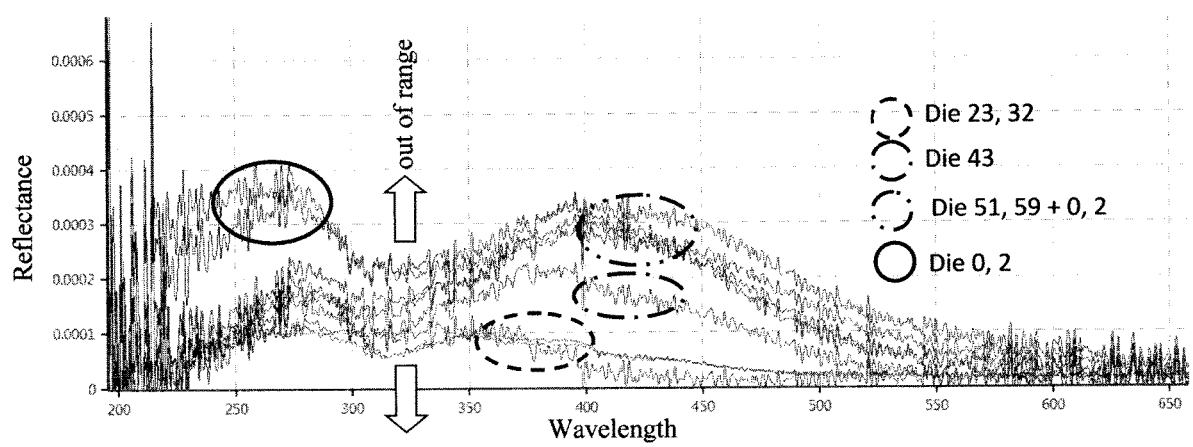
FIG. 12 is a plot combining scatterometry scans from the die in FIGS. 5-11 according to an embodiment of the present invention.

The present techniques are further described by way of reference to the following non-limiting examples. FIGS. 5-11 provide SEM images of defects (silicon germanium (SiGe) nodules) in different die, i.e., Die 23, Die 43, Die 51, Die 0, Die 32, Die 59 and Die 2, respectively. SiGe nodules are the result of unwanted growth during SiGe epitaxy. The scatterometry scans for each of the die are combined into a single plot shown in FIG. 12. As provided above, for training purposes, the scatterometry scans are performed at the same location on the wafers as the SEM. In this example, this location corresponds to specific die on the wafers. As shown in FIG. 12, the scans can be used to effectively discern defect density and average defect size. As provided above, if/when defects merge, the output will be smaller defect density, and larger average size. Referring to FIG. 12 for instance, the scans of dies 0, 2 are different from dies 51, 59 in a region around 260 nanometers (nm), but they overlap with dies 51, 59 in another region around 430 nm. Thus, the defect density in dies 0, 2, 51, 59 is similarly heavy, which is why their scans have similar feature in the region around 430 nm. However, in dies 0, 2, the defects merge, resulting in a larger defect size, which contributes to the peak-like feature in the region around 260 nm in dies 0, 2.

If the scans in FIG. 12 are used as the training data set, then any spectra that are outside of the band defined by the upper and lower boundaries of the spectra are not within range. See FIG. 12.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for defectivity detection, comprising the steps of:
   capturing scanning electron microscope (SEM) images of defects from a plurality of training wafers;
   classifying type and density of the defects from the SEM images;
   making training scatterometry scans of a same location on the training wafers as the SEM images;
   training a machine learning model to correlate the training scatterometry scans with the type and density of the defects from the same location in the SEM images;
   making scatterometry scans of production wafers; and
   detecting defectivity in the production wafers by measuring the type and density of the defects in the production wafers using the machine learning model, as trained, and the scatterometry scans of the production wafers.

2. The method of claim 1, further comprising the steps of:
   capturing optical beam images of the training wafers;
   identifying one or more locations, containing the defects, that appear differently in the optical beam images of the training wafers; and
   capturing the SEM images of the defects from the one or more locations of the training wafers.

3. The method of claim 1, wherein the scatterometry scans of the production wafers are made of one or more individual locations on each of the production wafers.

4. The method of claim 1, wherein the scatterometry scans of the production wafers are whole wafer scans made of each of the production wafers.

5. The method of claim 1, wherein the scatterometry scans of the production wafers are made at different points during a semiconductor fabrication process.

6. The method of claim 1, further comprising the step of:
   determining whether the scatterometry scans of the production wafers are within a range of the training scatterometry scans.

7. The method of claim 6, wherein at least a given one of the scatterometry scans of at least a given one of the production wafers is outside of the range of the training scatterometry scans, the method further comprising the steps of:
  capturing a new SEM image of the defects from the given production wafer;
  classifying the type and density of the defects from the new SEM image; and
  training the machine learning model to correlate the given scatterometry scan with the type and density of the defects from the new SEM image.

8. A non-transitory computer program product for defectivity detection, the computer program product comprising a computer readable storage medium having program instructions embodied therewith, the program instructions executable by a computer to cause the computer to:
  obtain SEM images of defects from a plurality of training wafers;
  classify type and density of the defects from the SEM images;
  obtain training scatterometry scans of a same location on the training wafers as the SEM images;
  train a machine learning model to correlate the training scatterometry scans with the type and density of the defects from the same location in the SEM images;
  obtain scatterometry scans of production wafers; and
  detect defectivity in the production wafers by measuring the type and density of the defects in the production wafers using the machine learning model, as trained, and the scatterometry scans of the production wafers.

9. The non-transitory computer program product of claim 8, wherein the program instructions further cause the computer to:
  obtain optical beam images of the training wafers;
  identify one or more locations, containing the defects, that appear differently in the optical beam images of the training wafers; and
  capture the SEM images of the defects from the one or more locations of the training wafers.

10. The non-transitory computer program product of claim 8, wherein the scatterometry scans of the production wafers are made of one or more individual locations on each of the production wafers.

11. The non-transitory computer program product of claim 8, wherein the scatterometry scans of the production wafers are whole wafer scans made of each of the production wafers.

12. The non-transitory computer program product of claim 8, wherein the scatterometry scans of the production wafers are made at different points during a semiconductor fabrication process.

13. The non-transitory computer program product of claim 8, wherein the program instructions further cause the computer to:
  determine whether the scatterometry scans of the production wafers are within a range of the training scatterometry scans.

14. The non-transitory computer program product of claim 13, wherein at least a given one of the scatterometry scans of at least a given one of the production wafers is outside of the range of the training scatterometry scans, and wherein the program instructions further cause the computer to:
  obtain a new SEM image of the defects from the given production wafer;
  classify the type and density of the defects from the new SEM image; and
  train the machine learning model to correlate the given scatterometry scan with the type and density of the defects from the new SEM image.

15. A system for defectivity detection, the system comprising at least one processor device, coupled to a memory, the processor device being implementable to:
  obtain SEM images of defects from a plurality of training wafers;
  classify type and density of the defects from the SEM images;
  obtain training scatterometry scans of a same location on the training wafers as the SEM images;
  train a machine learning model to correlate the training scatterometry scans with the type and density of the defects from the same location in the SEM images;
  obtain scatterometry scans of production wafers; and
  detect defectivity in the production wafers by measuring the type and density of the defects in the production wafers using the machine learning model, as trained, and the scatterometry scans of the production wafers.

16. The system of claim 15, further comprising:
  a SEM configured to capture the SEM images of the defects from the plurality of training wafers.

17. The system of claim 15, further comprising:
  a scatterometer configured to i) make the training scatterometry scans of the same location on the training wafers as the SEM images and ii) make the scatterometry scans of the production wafers.

18. The system of claim 15, wherein the processor device is further implementable to:
  obtain optical beam images of the training wafers;
  identify one or more locations, containing the defects, that appear differently in the optical beam images of the training wafers; and
  capture the SEM images of the defects from the one or more locations of the training wafers.

19. The system of claim 15, wherein the processor device is further implementable to:
  determine whether the scatterometry scans of the production wafers are within a range of the training scatterometry scans.

20. The system of claim 19, wherein at least a given one of the scatterometry scans of at least a given one of the production wafers is outside of the range of the training scatterometry scans, and wherein the processor device is further implementable to:
  obtain a new SEM image of the defects from the given production wafer;
  classify the type and density of the defects from the new SEM image; and
  train the machine learning model to correlate the given scatterometry scan with the type and density of the defects from the new SEM image.

* * * * *